United States Patent
Choi et al.

(10) Patent No.: US 9,473,604 B2
(45) Date of Patent: Oct. 18, 2016

(54) MOBILE TERMINAL

(71) Applicant: LG Electronics Inc., Seoul (KR)

(72) Inventors: Dongjun Choi, Seoul (KR); Minchul Shin, Seoul (KR); Minho Park, Seoul (KR); Dongyoup Han, Seoul (KR); Dawoon Jung, Seoul (KR); Youngil Cho, Seoul (KR); Heeyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/718,588

(22) Filed: May 21, 2015

(65) Prior Publication Data

US 2016/0156755 A1    Jun. 2, 2016

(30) Foreign Application Priority Data

Nov. 27, 2014 (KR) .................. 10-2014-0167217
Apr. 9, 2015 (KR) .................. 10-2015-0050048

(51) Int. Cl.
*H04M 1/00* (2006.01)
*H04M 1/02* (2006.01)
*G06F 1/16* (2006.01)

(52) U.S. Cl.
CPC .......... *H04M 1/0266* (2013.01); *G06F 1/1637* (2013.01); *H04M 1/0249* (2013.01); *H04M 1/0279* (2013.01)

(58) Field of Classification Search
CPC .......... H04M 1/0266; H04M 1/0249; H04M 1/0279
USPC .................. 455/575.1, 575.8, 90.3
See application file for complete search history.

(56) References Cited

U.S. PATENT DOCUMENTS

| | | | |
|---|---|---|---|
| 8,139,177 B2* | 3/2012 | Nishizawa | G02F 1/133305 349/58 |
| 8,467,172 B2* | 6/2013 | Sugimori | H04M 19/04 361/679.01 |
| 8,493,535 B2* | 7/2013 | Enomoto | G02F 1/133536 349/122 |
| 2009/0015747 A1* | 1/2009 | Nishizawa | G02F 1/133308 349/58 |
| 2009/0312063 A1* | 12/2009 | Soto Nicolas | H04M 1/0268 455/566 |
| 2012/0242588 A1* | 9/2012 | Myers | G06F 1/1637 345/173 |
| 2012/0329528 A1* | 12/2012 | Song | H04M 1/0268 455/566 |
| 2013/0237288 A1* | 9/2013 | Lee | G06F 3/041 455/566 |
| 2013/0279088 A1* | 10/2013 | Raff | G06F 1/1637 361/679.01 |
| 2014/0141841 A1* | 5/2014 | Yeo | H04M 1/0202 455/566 |
| 2015/0264163 A1 | 9/2015 | Sato | |

FOREIGN PATENT DOCUMENTS

| | | |
|---|---|---|
| JP | 9-152584 A | 6/1997 |
| WO | WO 2013/069212 A1 | 5/2013 |
| WO | WO 2014/061476 A1 | 4/2014 |

\* cited by examiner

*Primary Examiner* — April G Gonzales
(74) *Attorney, Agent, or Firm* — Birch, Stewart, Kolasch & Birch, LLP

(57) ABSTRACT

A mobile terminal is disclosed, by which a display and a case can be uniformly attached to each other with a reinforced adhesive strength. The present invention includes a case, a display unit installed on the case, a seating part provided to the case, the seating part configured to support the display unit, and a channel provided to the seating part, the channel configured to receive an adhesive for coupling the display unit and the case together. The channel includes a bottom portion, a first wall surface extending from the bottom portion and a second wall surface extending from the bottom portion. The second wall surface is disposed closer to a center of the case than the first wall surface. And, the second wall surface tilts at a prescribed angle toward the center of the case.

19 Claims, 17 Drawing Sheets

MOBILE TERMINAL

Pursuant to 35 U.S.C. §119(a), this application claims the benefit of earlier filing date and right of priority to Korean Applications No. 10-2014-0167217, filed on Nov. 27, 2014, and No. 10-2015-0050048, filed on Apr. 9, 2015, the contents of which are hereby incorporated by reference herein in their entirety.

BACKGROUND OF THE INVENTION

1. Field of the Invention

The present invention relates to a mobile terminal and, more particularly, to a coupled structure of a display unit and case of the mobile terminal.

2. Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

Thus, as the multimedia functionality is emphasized, a size of a display of a mobile terminal tends to increase in order to provide a user with better views of the various media and functions mentioned in the foregoing description. On the contrary, a size of the mobile terminal tends to decrease to facilitate portability. Hence, in order to implement a smaller terminal size, a case is designed small and a design for reducing a structure for coupling a display unit with the case is taken into consideration like other parts of the case. Owing to this reason, a contact area between a display unit and a case coupled together can be reduced.

Moreover, a large display is advantageous in aspect of multimedia functionality. Yet, it may be difficult for a user to concentrate on information displayed on the large display due to a size of the large display. Therefore, in order for a user to easily concentrate on displayed information, a display having a prescribed curvature tends to apply to a mobile terminal recently. However, in order to match the display having the prescribed curvature, a case, and more particularly, a part for coupling the display and the case together has a prescribed curvature as well. Hence, it may be difficult to stably install a coupling member on the case or display or to uniformly apply an adhesive due to the curvature.

As mentioned in the foregoing description, the recent design change of a mobile terminal may weaken the coupling strength between a display and a case. Hence, the demand for a solution for maintaining or strengthening the coupling strength appropriately is rising.

SUMMARY OF THE INVENTION

Accordingly, the present invention is directed to a mobile terminal that substantially obviates one or more problems due to limitations and disadvantages of the related art.

One object of the present invention is to provide a mobile terminal, by which an adhesive can be uniformly applied between a display unit and a case.

Another object of the present invention is to provide a mobile terminal, by which a space between a display unit and a case can be uniformly filled up with an adhesive.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a case, a display unit installed on the case, a seating part provided to the case, the seating part configured to support the display unit, and a channel provided to the seating part, the channel configured to receive an adhesive for coupling the display unit and the case together, wherein the channel includes a bottom portion, a first wall surface extending from the bottom portion and a second wall surface extending from the bottom portion, wherein the second wall surface is disposed closer to a center of the case than the first wall surface, and wherein the second wall surface tilts at a prescribed angle toward the center of the case.

Preferably, the display unit may have a prescribed curvature. More preferably, the display unit may have a curvature formed along a length direction of the mobile terminal.

Preferably, the case may include an opening having the display unit installed thereon and the seating part may extend toward the center of the case from an inner circumferential surface of the case enclosing the opening. Preferably, the display unit may include a display module and a window covering the display module and the window may be attached to the seating part.

Preferably, the first wall surface may extend in a manner of being substantially normal to the bottom portion of the channel. Preferably, the second wall surface may tilt at 30 degrees against a horizontal plane including the bottom portion of the channel. Preferably, the channel may further include a third wall surface extending normally from the second wall surface.

Preferably, the mobile terminal may further include a spacer provided to the seating part, the spacer configured to maintain an interval between the display unit and the seating part. More preferably, the spacer may include a first lateral surface and a second lateral surface spaced apart in a prescribed distance from the first lateral surface to be disposed closer to an outside of the case, the second lateral surface tilting at a prescribed angle toward the center of the case. Moreover, the second lateral surface may be formed in continuation with the second wall surface.

Preferably, the mobile terminal may further include a pattern provided onto the seating part, the pattern configured to hold an adhesive supplied to the seating part not to flow. More preferably, the pattern may be provided to a top surface of the seating part formed between an inner end of the seating part and the channel. More preferably, the pattern may comprise a peak and a bottom, which are formed alternately. More preferably, when the adhesive is applied to the pattern, the pattern may be configured to communicate with an outside of the pattern. And, both ends of the bottom of the pattern may communicate with the channel and an inside of the case, respectively.

Accordingly, the present invention provides the following effects and/or features.

First of all, according to one embodiment of the present invention, the present invention leads an adhesive to a bottom part of a channel provided to a seating part, thereby filling the channel with the adhesive uniformly and applying the adhesive to the seating part entirely and uniformly.

Secondly, according to another embodiment of the present invention, the present invention hold an adhesive on a seating part not to flow, thereby applying the adhesive onto the seating part uniformly.

Therefore, the present invention enables a display unit and a case, i.e., a seating part to adhere to each other uniformly, thereby considerably increasing adhesion strength.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Figure 1A:
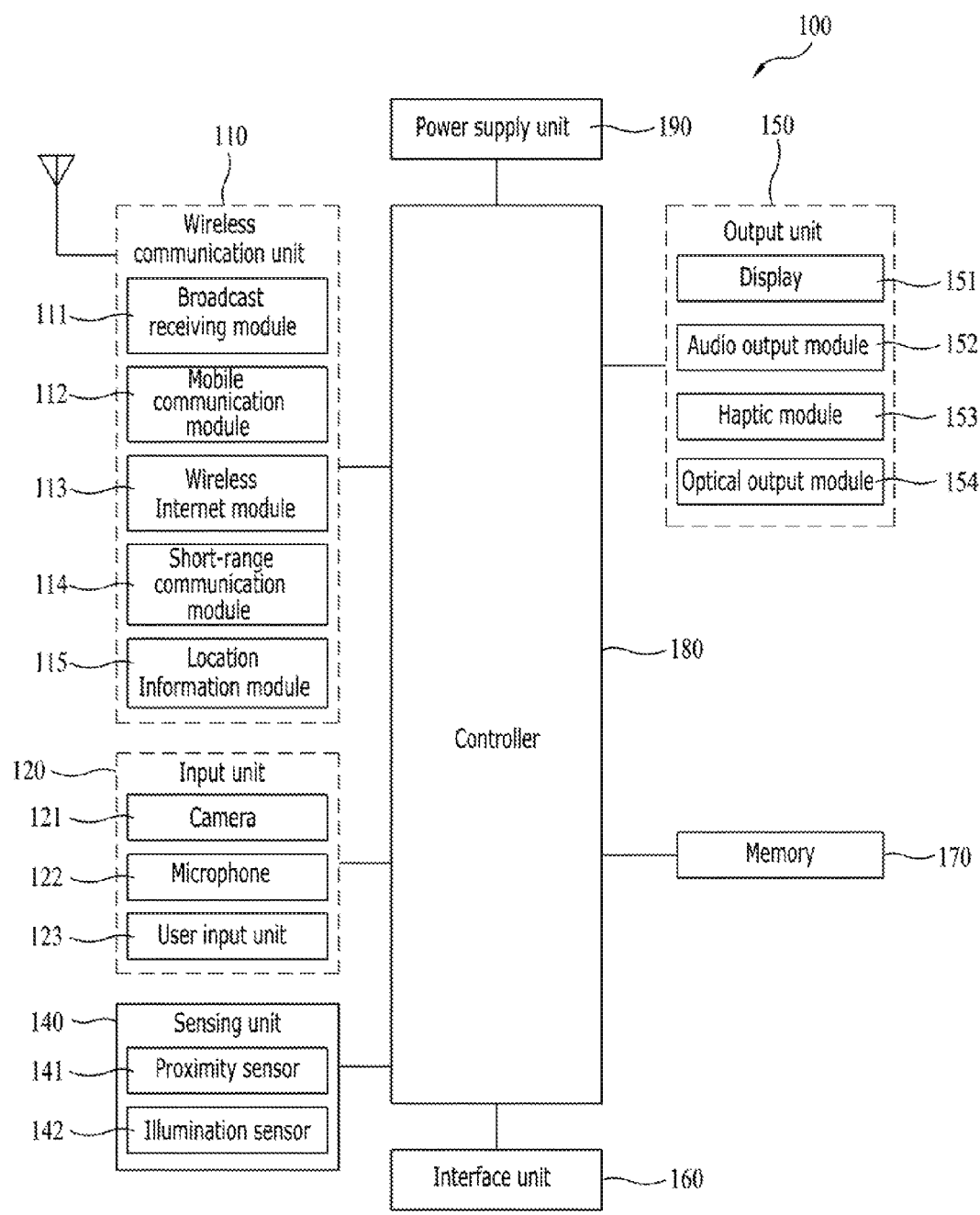
FIG. 1A is a block diagram to describe a mobile terminal according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "comprise", "include" or "has" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
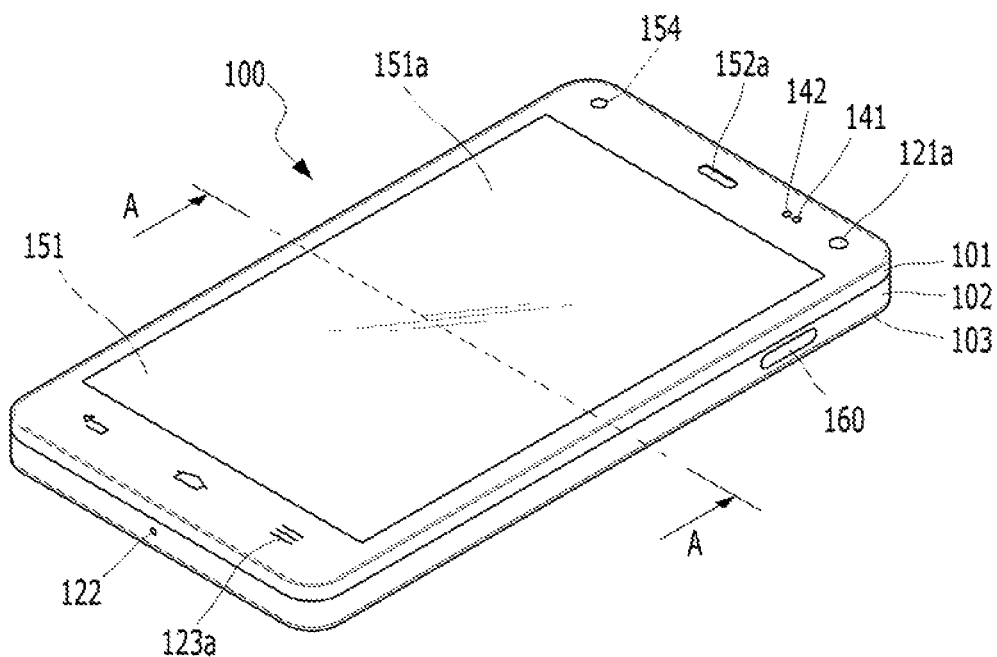
FIG. 1B and FIG. 1C are perspective diagrams for one example of a mobile terminal according to the present invention viewed in different directions, respectively.
Figure 1C:
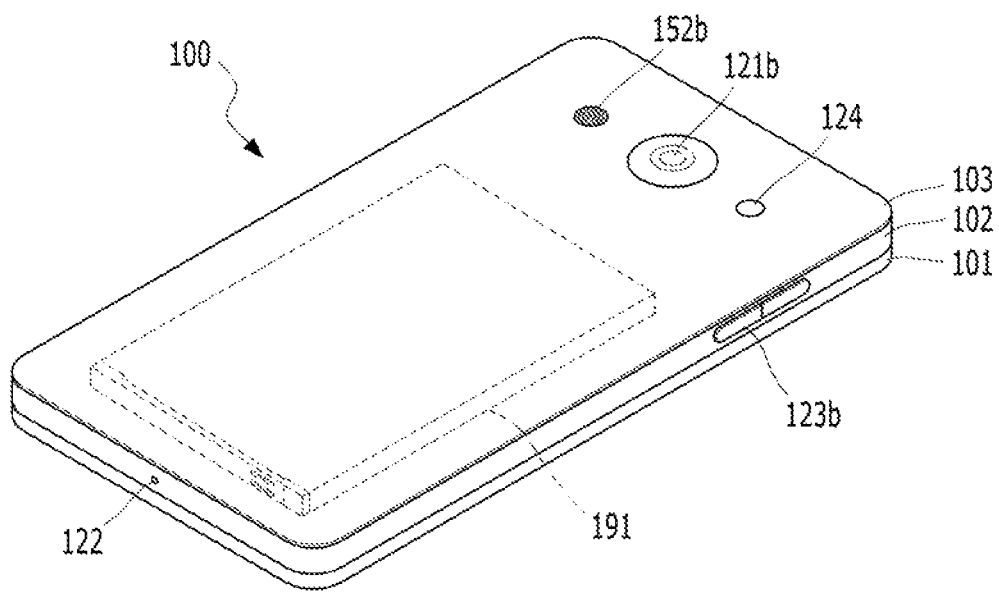

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
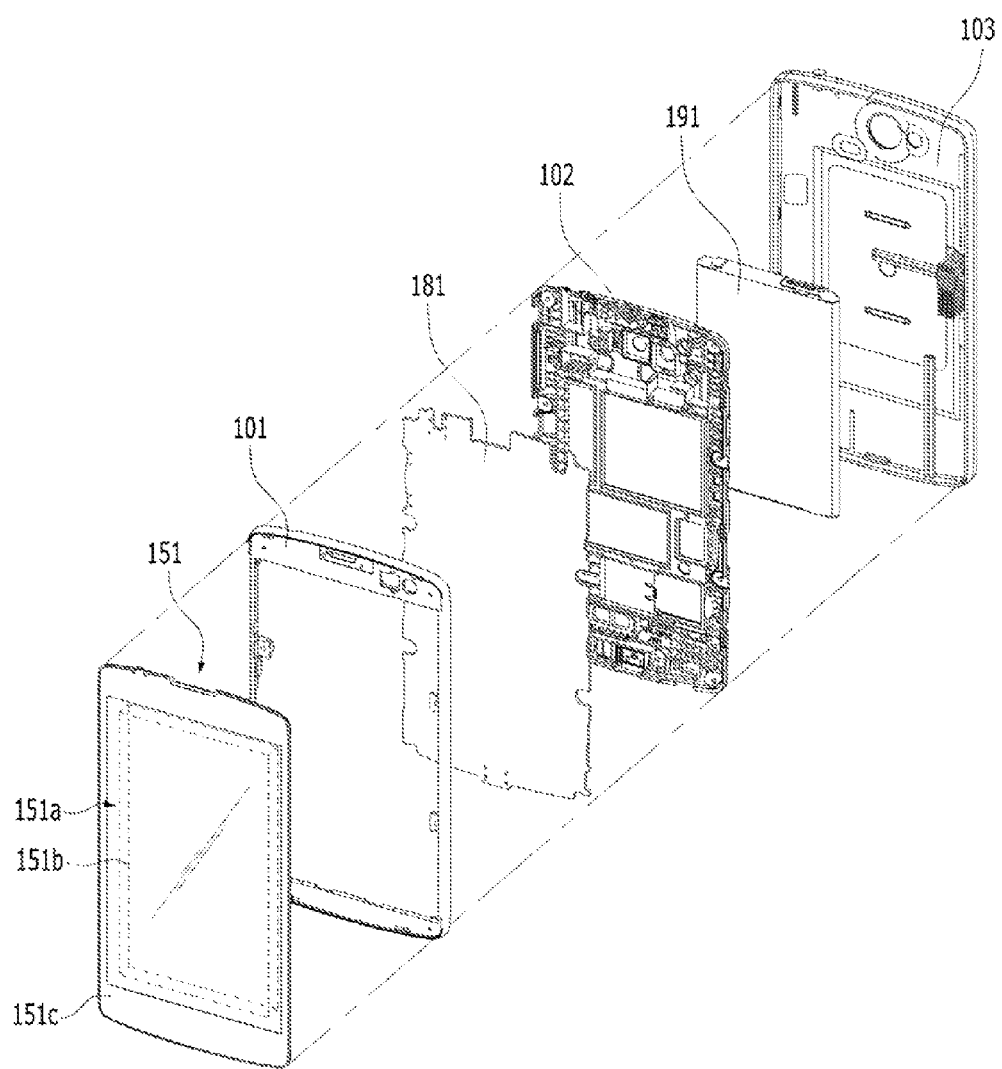
FIG. 2 is an exploded perspective diagram for one example of a mobile terminal according to the present invention.
Figure 3:
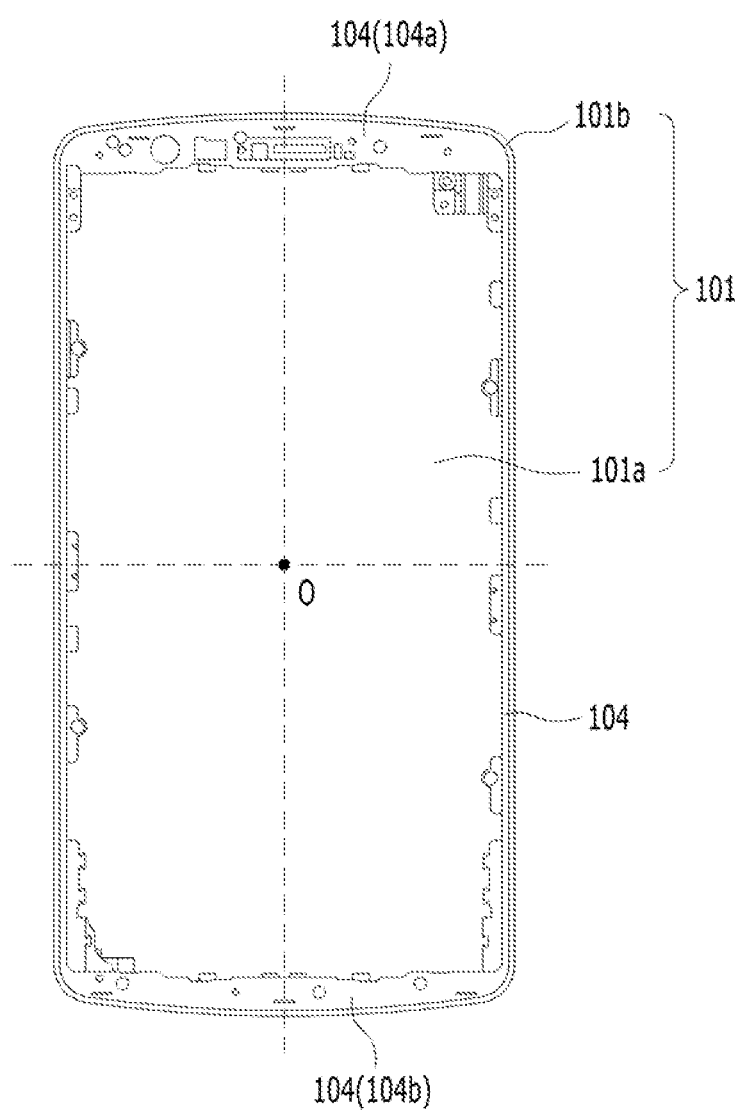
FIG. 3 is a layout for one example of a front case of a mobile terminal according to the present invention.
Figure 4:
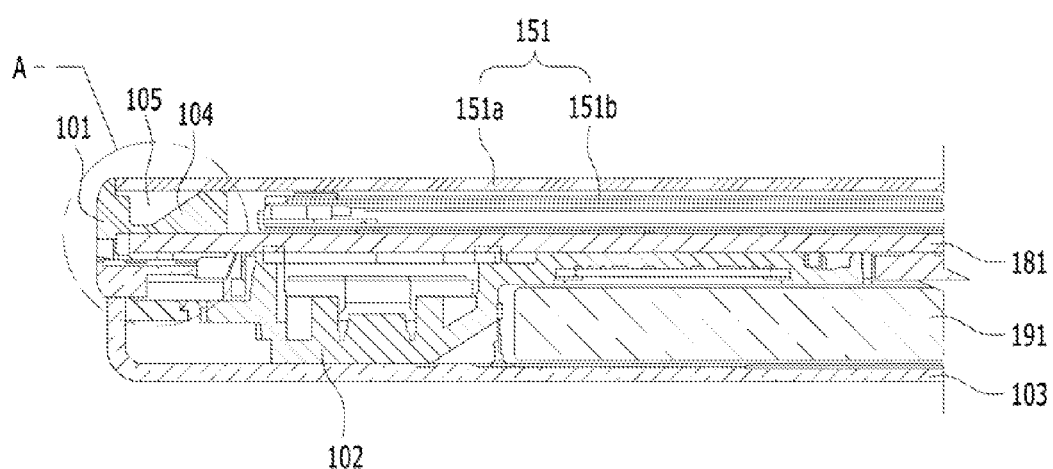
FIG. 4 is a cross-sectional diagram obtained along a cutting-plane line A-A shown in FIG. 1B or FIG. 5.

FIG. 2 is an exploded perspective diagram for one example of a mobile terminal according to the present invention. FIG. 3 is a layout for one example of a front case of a mobile terminal according to the present invention. And, FIG. 4 is a cross-sectional diagram obtained along a cutting-plane line A-A shown in FIG. 1B. A mechanical structure, and more particularly, a coupled structure between a display unit 151 and a frame for one example of a mobile terminal according to the present invention is described in detail with reference to the above-listed drawings as follows.

First of all, as mentioned in the foregoing description with reference to FIGS. 1A to 1C, the mobile terminal 100 may have the case configured to form its exterior. The case may include the front case 101 disposed on a front side of the mobile terminal 100 and a rear case 102 disposed on a rear side of the mobile terminal to be coupled with a rear surface of the front case 101.

The above-configured case may have a prescribed inner space formed therein. And, various parts and components can be installed in the inner space. The display unit 151 can be installed or located at the case. In association with installations of the various parts and components, the case may have an opening 101a of a prescribed size and the display unit 151 can be located or installed in the opening 101a. In particular, since the display unit 151 is installed on the front side of the mobile terminal 100 to provide a better view to a user, as shown in FIG. 3, the front case 101 of the case can have the opening 101a of the prescribed size and the opening 101a can receive the display unit 151 therein. The opening 101a may be disposed at a center of the mobile terminal 100, and more specifically, at a center of the front case 101. Owing to the formation of the opening 101a, the front case 101 can have a frame 101b relatively formed on a circumference of the opening 101a. The display unit 151 can be inserted in the frame 101b. Hence, the frame 101b can enclose an outer circumference of the display unit 151.

In order to assist the installation of the display unit 151, the mobile terminal 100 may include a seating part (or a seating portion) 104. The seating part 104 is provided to or located at the case and can be configured to support the display unit 151. Referring to FIG. 3 and FIG. 4, the seating part 104 may be provided to the front case 101 to neighbor to the display unit 151. In particular, since a prescribed inner circumferential surface is formed on the case relatively around the opening 101a due to the formation of the opening 101a, the seating part 104 may be configured to extend in an inward direction from the inner circumferential surface of the case enclosing the opening 101a. On the other hand, referring to FIG. 3, the seating part 104 may be configured to extend toward a center O of the case from the inner circumferential surface. Moreover, since the opening 101a is substantially formed in the front case 101, the seating part 104 may be described as extending in the inward direction from the front case 101 enclosing the opening 101a, and more particularly, from the inner circumferential surface of the frame 101b or as extending from the inner circumferential surface toward the center O of the front case 101. As a result of such configuration, the seating part 104 is provided to the case, and more particularly, to the front case 101 or the inner circumferential surface of the front case 101 and may include a flange configured to extend in an inward direction of the front case 101.

Referring to FIG. 3, the seating part 104 may be provided to the case, and more particularly, to each of two lateral portions and top and bottom portions of the front case 101. The seating parts 104a and 104b of the top and bottom portions may be configured relatively wider than the rest of the seating part 104 for the installation of various parts such as cameras, sensors, microphones, speakers and the like. On the other hand, in order to facilitate user's grip, a width of the mobile terminal 100 may be considerably limited. Due to these reasons, in order to have a width as narrow as possible, as shown in FIG. 3, the seating part 104 of the two lateral portions may be configured considerably narrower than the seating parts 104a and 104b of the top and bottom portions.

Referring to FIG. 2 and FIG. 4, the display unit 151 may include a display module 151b and a window 151a configured to cover the display module 151b. The display module 151b may include the aforementioned display device such as LCD, OLED and the like and corresponds to a component configured to actually display image information. The window 151a may be disposed in front of the display module 151b and is able to protect the display module 151b externally. The window 151a is equipped with such a protective function and should allow information, which is displayed on the display module 151b, to be watched by a user. Hence, the window 151a may be generally formed of tempered glass to have appropriate stiffness and transparency. Alternatively, if a prescribed level of flexibility is requested, the window 151a may be formed of a transparent plastic material. On the other hand, since the window 151a is formed of a transparent material overall, other portions of the mobile terminal 100, e.g., one portion of the neighboring front case 101 or internal components or parts of the mobile terminal may be exposed to a user as well as the display module 151b. Such exposure may degrade appearance of the mobile terminal 100. Hence, it is preferable that a prescribed portion of the window 151a except a prescribed region for exposing image information displayed on the display module 151b may be configured non-transparent. In particular, a non-transparent layer may be coated on or attached to an outer circumferential portion enclosing the display module 151b on the rear surface of the window 151a. Such a non-transparent layer may be called a bezel 151c. And, the bezel 151c may be configured in a manner that the input unit 120 or the output unit 150 of the mobile terminal 100 can be connected to an outside of the mobile terminal 100. To this end, a portion of the bezel 151c may be removed to form prescribed openings. And, the related input and the related output units may be arranged on the openings. Through the openings and the transparent window 151a, the input unit and the output units can be externally connected to detect prescribed information externally or to output prescribed information externally.

The display unit 151 may be installed on the case to be disposed on the front side of the mobile terminal 100. In particular, the display unit 151 may be installed in the case, i.e., the front case 101. In particular, the display unit 151, i.e., the window 151a can be inserted in the case, i.e., the front case 101. Owing to such insertion, the display unit 151, i.e., the window 151a can be received in the opening 101a of the case (e.g., the front case 101). Simultaneously, the display unit 151, i.e., the window 151a can be enclosed by the case (i.e., the frame 101b of the front case 101). Moreover, when the display unit 151 (i.e., the window 151a) is inserted, the display unit 151 (i.e., the window 151a) can be stably supported by the seating part 104 so as to maintain its location within the case (i.e., the front case 101) by avoiding interference with the parts or components within the mobile terminal 100. Hence, the display unit 151 (i.e., the window 151*a*) may configure the front side of the mobile terminal together with the front case 101 (e.g., the frame 101*b*) and can be exposed to a user to display the image information of the display module 151*b* disposed in rear of the display unit 151. Referring to FIG. 2 and FIG. 4, the display module 151*b* may be directly attached to the rear surface of the window 151*a*. The display module 151*b* can be directly attached to the window 151*a* in various ways. And, an adhesive can be usable for the direct attachment most conveniently. In this case, the display module 151*b* may be coupled with the case, i.e., the front case 101 through the window 151*a*. Hence, through this coupling relation, the display unit 151 can be substantially installed on the case, i.e., the front case 101. On the other hand, the display module 151*b* may be directly fixed to the case, i.e., the front case 101 instead of the window 151*a*. Alternatively, the display module 151*b* may be fixed to the rear case 102 or an auxiliary frame (not shown in the drawing) configured to support a rear surface of the display unit 151 by being inserted between the front case 101 and the rear case 102. The auxiliary frame may be formed of a metal based material to reinforce stiffness of the mobile terminal 100. Yet, although the auxiliary frame is advantageous in supporting the stiffness of the mobile terminal 100, it may cause a problem of increasing a thickness of the mobile terminal 100, a problem of increasing a weight of the mobile terminal 100, and a problem of raising a manufacturing cost of the mobile terminal 100. Hence, as the auxiliary frame is excluded, a main board may be able to support the rear surface of the display unit 151 instead.

Referring now to FIG. 2, the mainboard 181 is a component on which various electronic parts, and more particularly, various processors configuring the controller 180 are mounted together with other assistant circuitry and devices. And, the mainboard 181 is able to control operations of the mobile terminal 100 overall. Generally, various electronic parts can be installed on both sides of the mainboard 181 overall. Yet, as mentioned in the foregoing description, if the mainboard 181 is configured to support the display module 151*b* by directly contacting with the display module 151*b*, the parts may not be disposed on a portion corresponding to the rear surface of the display module 151*b* to avoid interference with the display module 151*b*. And, the rear case 102 may be disposed in a manner of covering a rear surface of the mainboard 181. The rear case 102 may configure an appearance of the mobile terminal 100 by being coupled with the front case 101. The rear case 102 and the front case 101 are coupled with each other through their circumferential portions, thereby providing a mechanic room configured to receive various parts including the mainboard 181 in-between.

Figure 5:
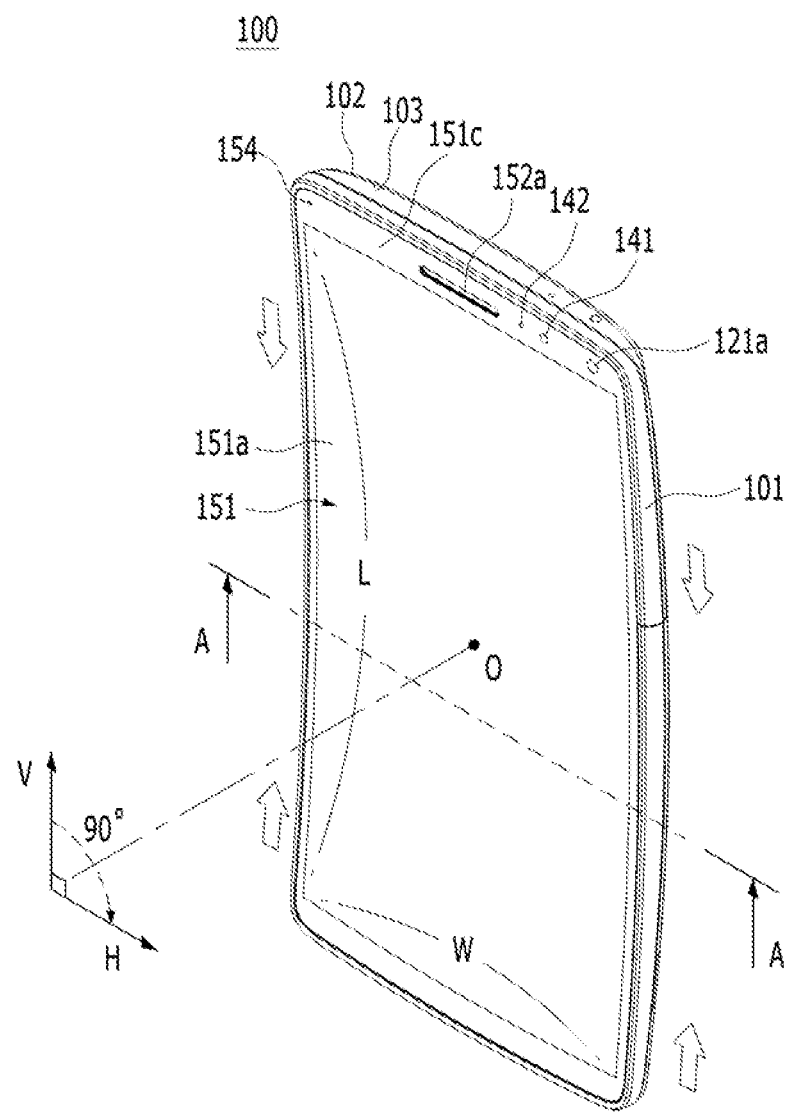
FIG. 5 is a perspective diagram for one example of a mobile terminal including a display unit having a curvature.

Meanwhile, users recently make a demand for watching more and various informations through the mobile terminal 100 easily and conveniently. To meet such user's demand, the display unit, i.e., the display module 151*b* tends to increase in size. Yet, since a user may have difficulty in concentrating on information displayed on a large display, a recent mobile terminal tends to employ a display unit 151 having a prescribed curvature. FIG. 5 shows one example of a mobile terminal including a display unit having such a curvature. Generally, the display unit 151, and more particularly, the display module 151*a*, as shown in FIG. 5 as well as in FIG. 2, may have a shape of a rectangular panel having a width W and a length L greater than the width W. If the length L is oriented in a direction V vertical to a ground, a length between top and bottom ends of the display unit 151, i.e., the length L shown in the drawing becomes relatively longer than the width W, thereby providing the same orientation of a normal paper document. Hence, such orientation may be advantageous for the case of displaying general text information. Unlike text information, images (i.e., still images (picture), moving images (video)) then to have an aspect ratio of a width and a length greater than the width. In order to watch the images as large as possible using a full screen of the display module, the relatively longer length L may be advantageously oriented in a horizontal direction H. Hence, when a user watches a still image (e.g., a picture) or a moving image (e.g., a video), as shown in the coordinates system of FIG. 5, the user is able to rotate the length L by about 90 degrees from the orientation of the vertical direction V in order for the length L to be oriented in the horizontal direction H. In this horizontal orientation, the width W forms both lateral portions of a screen. In order to enhance user's concentration, both of the lateral portions may be preferably disposed to be relatively close to the user and a center portion of the screen may be preferably disposed to be relatively distant from the user. Due to these reasons, the display unit 151 is configured to have a prescribed curvature to have a shape capable of raising the concentration. Preferably, referring to FIG. 5, the display unit 151 may have a curvature formed along a direction of the length L; however, if necessary, the display unit 151 may have a curvature formed along a direction of the width W. Referring to FIG. 5, the case may have a curvature in accordance with the curvature of the display unit 151. Yet, since the rest of the structures can be designed identical to a flat mobile terminal except having a curvature, all the structures shown in FIGS. 1 to 3 and the descriptions with reference to FIGS. 1 to 3 are identically applicable to the mobile terminal shown in FIG. 5. Likewise, all the structures shown in FIGS. 6 to 13 and the descriptions with reference to FIGS. 6 to 13 are identically applicable to the mobile terminal shown in FIG. 5. Particularly, the mobile terminal 100 shown in FIG. 5 has the curvature along the length L but fails to have the curvature along the width W. In particular, the mobile terminal shown in FIG. 5 and the mobile terminal shown in FIGS. 1 to 3 are identical to each other in the cross-sections in the direction of the width W. Hence, the cross-section shown in FIG. 4 can become a cross-sectional diagram along the cutting plane line A-A shown in FIGS. 1 to 3 as well as the cross-section in the direction of the width W along the cutting plane line A-A shown in FIG. 5. Likewise, all cross-sections obtained along the width direction in FIGS. 6 to 13 may correspond to the width-directional cross-sections of the mobile terminal shown in FIG. 5 as well as to the width-directional cross-sections of the mobile terminal shown in FIGS. 1 to 3.

Figure 6:
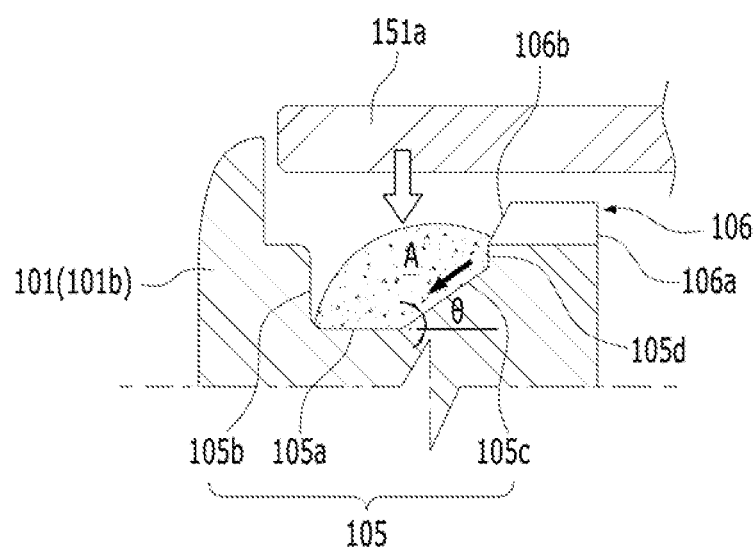
FIG. 6 is a cross-sectional diagram for one example of a process for coupling a display unit and a case together in a mobile terminal according to the present invention.
Figure 7:
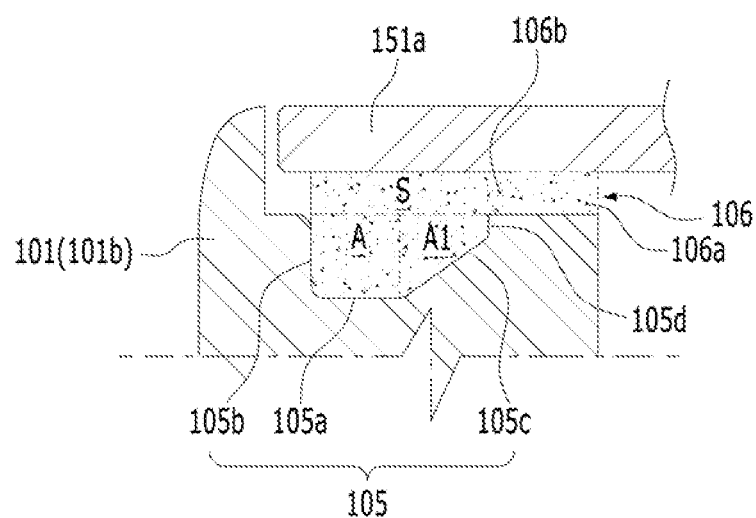
FIG. 7 is a diagram for one example of a coupled display unit and case in a mobile terminal according to the present invention.

Regarding both of the aforementioned flat terminal shown in FIGS. 1 to 3 and the curved terminal shown in FIG. 5, in order for the display unit 151 to be installed on the case, i.e., the front case 101, the window 151*a* of the display unit 151 can be coupled with the case (i.e., the front case 101), and more particularly, with the seating part 104. The window 151*a* may be able to use a prescribed fastening member or other mechanical members for the coupling with the seating part 104. Yet, using the mechanical members may increase a volume of the mobile terminal 100 unnecessarily. Hence, referring to FIG. 6 and FIG. 7, the window 151*a* of the mobile terminal 100 may be attached to the seating part 104 using an adhesive A. The use of the adhesive can couple the window 151*a* and the seating part 104 stably without increasing a size of the coupled area. FIG. 6 is a cross-sectional diagram for one example of a process for coupling a display unit and a case together in a mobile terminal according to the present invention. FIG. 7 is a diagram for one example of a coupled display unit and case in a mobile terminal according to the present invention. Moreover, FIGS. 9 to 12 illustrate examples of the enlarged cross-section of the part 'A' shown in FIG. 4 as well FIG. 6 and FIG. 7. A coupled structure of the display unit 151 and the case, i.e., a coupled structure of the window 151a and the front case (particularly, the seating part 104) is described in detail with reference to the above drawings as follows.

In a coupling process, after an adhesive A has been applied to a surface of the seating part 104 confronting the rear surface of the window 151a, the window 151a can be put on the seating part 104 having the adhesive applied thereto. For solid adhesion, when the window 151a is disposed on the seating part 104, a prescribed pressure may be applied together. Yet, since the surface of the seating part 104 is flat approximately, it may be difficult to apply a sufficient amount of the adhesive A onto the surface of the seating part 104. Moreover, in case that the window 151a is pressed with a force applied to the surface of the seating part 104 for the solid adhesion, the adhesive A between the window 151a and the seating part 104 may flow into and/or out of the front case 101 due to the corresponding pressure. To solve these problems, referring to FIG. 6 and FIG. 7, a channel 105 may be provided to or located at the seating part 104. The channel 105, as shown in the drawings, may include a groove formed on the seating part 104. The channel 105 may be formed on the seating part 104 along an outer circumference of the case, i.e., the front case 101. When the adhesive A is applied, referring to FIG. 6, the channel 105 can basically maintain an amount of the adhesive A sufficient for the adhesion without over flow.

In particular, the channel 105 may have a configuration of a canal having an open top. The channel 105 may include a bottom portion (or part) 105a and first and second wall surfaces 105b and 105c extending from the bottom portion 105a to form both lateral portions of the channel 105. The first wall surface 105b and the second wall surface 105c can be disposed oppositely by being spaced apart from each other in a prescribed distance. Further, the first and second wall surfaces 105b and 105c may extend toward the display unit 151 from the bottom portion 105a. The first wall surface 105b may be disposed adjacent to the case, i.e., an outer circumferential portion of the front case 101. In particular, referring to FIG. 6 and FIG. 7, the first wall surface 105b can be disposed adjacent to the frame 101b of the front case 101. On the other hand, the second wall surface 105c may be spaced apart from the first wall surface 105b in an inward direction of the mobile terminal 100 or the case (e.g., the front case 101), and more particularly, toward the center O (cf. FIG. 3) of the mobile terminal 100 or the case (e.g., the front case 101) in a prescribed distance. Hence, the second wall surface 105c may be disposed closer to an inside of the mobile terminal 100 or the case (e.g., the front case 101) than the first wall surface 105b. On the other hand, the second wall surface 105c may be described as disposed closer to the center O of the mobile terminal 100 or the case (e.g., the front case 101) than the first wall surface 105b. Simply, the second wall surface 105c may be disposed between the first wall surface 105b and the center O of the mobile terminal 100 or the case (e.g., the front case 101).

The first wall surface 105b, as shown in the drawing, may substantially extend from the bottom portion 105a in a normal direction. If the first wall surface 105b has a prescribed inclination toward an outside of the case, i.e., the front case 101, the adhesive A stored in the channel 105 may easily leak out of the case by being led to an inclining surface when the window 151a is pressed on the seating part 104. Hence, the normal first wall surface 105b may be advantageous in preventing the leakage of the adhesive A. Meanwhile, the second wall surface 105c may normally extend from the bottom portion 105a like the first wall surface 105b. Yet, according to one example of the present application, the second wall surface 105c may tilt from an orientation normal to the bottom portion 105a toward the inside or center O of the mobile terminal 100 or the case (e.g., the front case 101). In particular, the second wall surface 105c may include an inclining surface oriented at a prescribed angle toward the inside or center O of the mobile terminal 100 or the case (e.g., the front case 101). Owing to the tilting orientation, the second wall surface 105c may enable the adhesive A provided within the channel 105 to flow toward the bottom portion 105a in a direction of arrow shown in FIG. 6. Hence, the second wall surface 105c leads the adhesive A to the bottom portion 105a, whereby the channel 105 can be filled up with the adhesive A from the bottom portion 105a sequentially and uniformly. Moreover, even if the adhesive A is supplied to the channel 105 unevenly and locally, the uniform filling can be continuously maintained owing to the leading by the second wall surface 105c. Eventually, the tilting second wall surface 10C determines a spreading direction of the adhesive A within the channel 105, accelerates the uniform filling with the adhesive A, and enables the adhesive A to be uniformly applied. Hence, the window 151a and the seating part 104 can be uniformly attached to each other and the adhesion strength between the window 151a and the seating part 104 can be enhanced. Comparing to the normally oriented first wall surface 105b, the tilting second wall surface 105c can supply the channel 105 with an additional adhesive A1 amounting to a portion indicated by a dotted line shown in FIG. 7 in addition to the former adhesive A. Hence, the additional adhesive A1 can provide a stronger adhesive strength. Recently, the mobile terminal 100 tends to be designed to have a smaller size for portability, whereby a size of the seating part 104 tends to be reduced as well. Since the reduced size of the seating part 104 brings a reduction of an adhesion area, an adhesive strength may be weakened as well. Yet, since the additional adhesive A1 can be supplied owing to the configuration of the tilting second wall surface 105c, although the seating part 104 is reduced, it is able to continuously maintain an appropriate adhesive strength. In order to effectively achieve the aforementioned effects (e.g., the flow leading, the uniform filling, etc.), considering general properties or other conditions of the adhesive A, referring to FIG. 7, the second side surface 105c may preferably has a tilt angle θ of 30 degrees against a horizontal plane including the bottom portion 105a. Simply, the tilt angle θ is 30° with regard to the bottom portion 105a.

Figure 8:
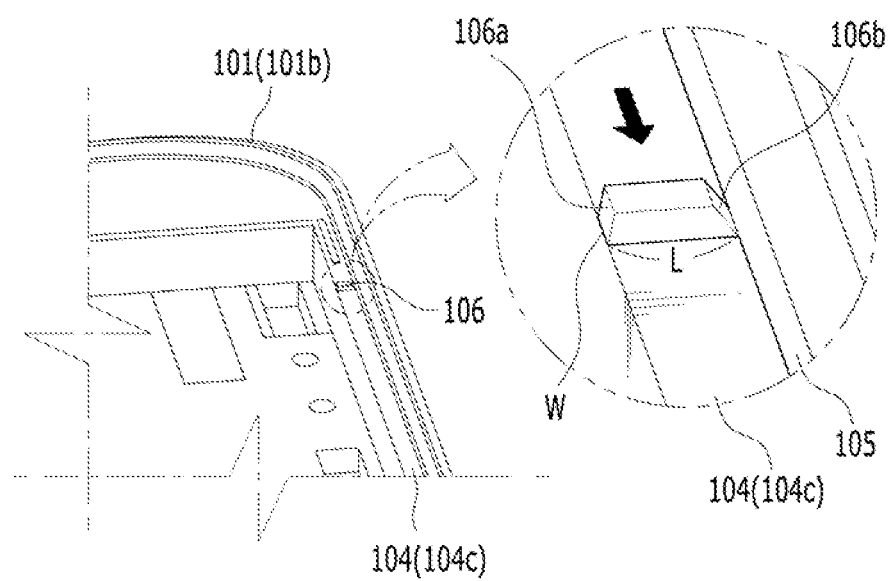
FIG. 8 is a perspective diagram for one example of a spacer in a mobile terminal according to the present invention.
Figure 9:
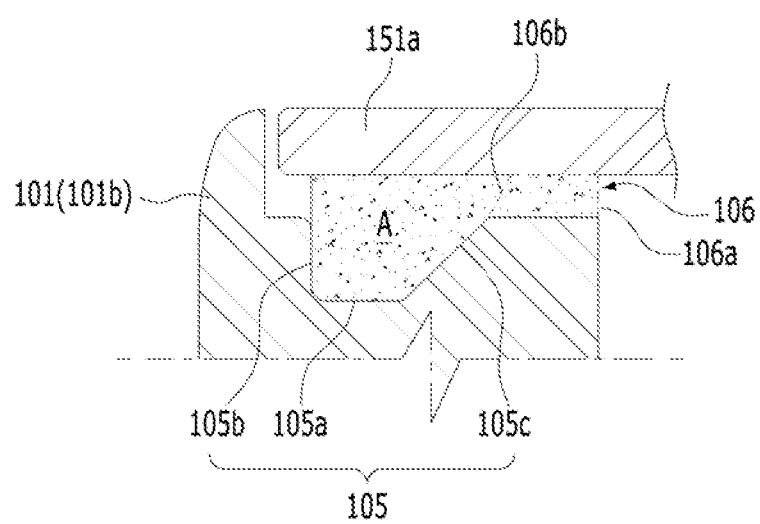
FIG. 9 is a cross-sectional diagram for one example of a spacer in a mobile terminal according to the present invention.

Referring to FIG. 9, the second side surface 105c may extend from the bottom portion 105a to the surface of the seating part 104, i.e., a surface 104c (cf. FIG. 8) opposite the window 151a. In this case, the second wall surface 105c can be continuously formed on the surface 104c of the seating part 104. Alternatively, referring to FIG. 6 and FIG. 7, the cannel 105 may further include a third wall surface 105d normally extending from the second wall surface 105c. The third wall surface 105d may extend toward the display unit 151 from the second wall surface 105c, and may extend substantially normal to the bottom portion 105a of the channel 105. In particular, the third wall surface 105d may extend from a second end portion opposite a first end portion of the second wall surface 105c connected to the bottom portion 105a and may extend to the surface 104c of the seating part 104 opposite the window 151a. The third wall surface 105d may play a role as a sort of dam. Hence, until the channel 105 is filled up with the adhesive A by staring with the bottom portion 105a, the third wall surface 105d can prevent the adhesive A from overflowing into the case over the channel 105 and the seating part 104. For instance, if a considerable amount of the adhesive A is abruptly provided into the channel 105, the third wall surface 105d can effectively prevent the adhesive A from flowing backward into the case.

The first wall surface 105b may be spaced apart from the outer circumferential portion of the case (e.g., the front case 101), and more particularly, from the frame 101b. As mentioned in the foregoing description, since the display unit 151 is inserted into the case (e.g., the front case 101), the outer circumferential portion of the case (e.g., the front case 101), and more particularly, the frame 101b can face or enclose the display unit 151 (the window 151a). Hence, the first wall surface 105b is spaced apart by a prescribed distance from the outer circumferential portion of the case (e.g., the front case 101), and more particularly, from the frame 101b. In particular, the first wall surface 105b neighbors to the outer circumferential portion of the case (e.g., the front case 101) or the frame 101b but fails to contact with it in direct. In more particular, the first wall surface 105b may be spaced inward from an inner circumferential surface of the outer circumferential portion of the case (e.g., the front case 101) or an inner circumferential surface of the frame 101b. If the first wall surface 105b directly abuts on (or contacts with) or connects with the inner circumferential surface of the front case 101 or the frame 101b, the adhesive A may be easily leak from the case through the inner circumferential surface of the frame 101b from the first wall surface 105b. Yet, if the first wall surface 105b is spaced apart from the inner circumferential surface of the frame 101b, as shown in the drawing, a sort of a step portion may be formed between the inner circumferential surface of the frame 101b and the first wall surface 105b. Owing to this step portion, the adhesive A leaking from the channel 105 should flow through a substantially long path to get out of the case. Hence, the aforementioned first wall surface 105b can effectively prevent the adhesive A from leaking out of the case. Moreover, considering the structure of the channel 105, if the first wall surface 105b is spaced apart in the manner mentioned in the foregoing description, the channel 105 may be described as spaced inward from the outer circumferential portion of the case (e.g., the front case 101).

Meanwhile, if the window 151a directly contacts with the surface of the seating part 104, the window 151a adheres to the seating part 104 using the adhesive A received in the channel 105 only. Yet, if the window 151a is spaced apart from the seating part 104 in a prescribed distance, as shown in FIG. 7, an additional adhesive S may apply between the window 151a and the seating part 104 to reinforce an adhesive strength. Due to this reason, a spacer 106 may be additionally provided to or located at the seating part 104. FIG. 8 is a perspective diagram for one example of a spacer in a mobile terminal according to the present invention. And, FIG. 9 is a cross-sectional diagram for one example of a spacer in a mobile terminal according to the present invention. The spacer 106 is shown in FIG. 6 and FIG. 7 which are referred to in describing a spacer in the following.

First of all, the spacer 106 may be provided to a surface of the seating part 104 opposite the display 151, i.e., the window 151a, as shown in the drawings. Referring to FIGS. 6, 7 and 9, the display unit 151 (i.e., the window 151a) may be spaced apart from the outer circumferential portion of the case (e.g., the front case 101), and more particularly, from the inner circumferential surface of the outer circumferential portion or the frame 101b in a prescribed distance. If the spacer 106 is disposed adjacent to the outer circumferential portion of the case (e.g., the front case 101), a user may see the spacer 106 through a clearance between the window and the case. Due to the clearance, the display unit 151 (i.e., the window 151a) may not be supported stably. Hence, referring to FIGS. 6 to 9, the spacer 106 may be provided to the surface 104c of the seating part 104 formed between the channel 105 and an inner end of the seating part 104. Thus, the spacer 106 can stably support the display unit 151 (i.e., the window 151a) without interfering with the channel 105 and being seen by a user. Moreover, the spacer 106 may protrude from the seating part 104 at a prescribed height toward the display 151, i.e., the window 151a. An end of the spacer 106 can support the display unit 151 (i.e., the window 151a) to be spaced apart from the seating part 104. Hence, the spacer 106 can maintain the clearance between the display unit 151 (i.e., the window 151a) and the seating part 104. By the clearance provided by the spacer 106, as shown in FIG. 7, the adhesive can be additionally applied across the seating part 104 and the channel 105. In particular, the additional adhesive S may be provided to a space above the surface of the seating part 104 formed between the channel 105 and the inner end of the seating part 104 as well as to the channel 105. Hence, the thickness of the adhesive part (substantially, the adhesive) is increased as well as the adhesion area, whereby a total adhesive strength can be considerably increased.

In particular, the spacer 106 can basically have a rectangular pillar shape. The spacer 106 may have first and second lateral surfaces 106a and 106b disposed opposite each other by being spaced apart from each other in a prescribed distance. The first lateral surface 106a may be disposed adjacent to the inner end of the seating part 104. Moreover, in order for the spacer 106 to secure a sufficiently large support area for supporting the window 151a and not to interfere with other internal parts of the mobile terminal 100, the first lateral surface 106a may be disposed in the same plane of the inner end of the seating part 104. On the other hand, the second lateral surface 106b may be spaced apart from the first lateral surface 106a toward an outer direction of the mobile terminal 100 or the case (e.g., the front case 101), and more particularly, toward an outside of the mobile terminal or the case (e.g., the front case 101) in a prescribed distance. In order for the spacer 106 to secure a support area as large as possible, the second lateral surface 106b is disposed on a boundary between the channel 106 and the seating part 104 (particularly, the surface of the seating part 104 opposite the window 151a). Hence, the second lateral surface 106b can be disposed closer to the outside of the mobile terminal 100 or the case (e.g., the front case 101) than the first lateral surface 106a. Alternatively, the second lateral surface 106b may be described as disposed closer to the outer circumferential portion of the mobile terminal 100 or the case (e.g., the front case 101), and more particularly, to the frame 101b of the front case 101 than the first lateral surface 106a. On the other hand, the first lateral surface 106a may be described as disposed closer to the inside or center O of the mobile terminal 100 or the case (e.g., the front case 101) than the second lateral surface 106b. Simply, the second lateral surface 106b may be disposed between the first lateral surface 106a and the outside of the mobile terminal 100 or the case (e.g., the front case 101).

The first lateral surface 106a, as shown in the drawing, can extend normally from the seating part 104 substantially. If the first lateral surface 106a has a prescribed inclination toward the inside of the case (i.e., the front case 101), it may interfere with other parts inside, the first lateral surface 106a preferably extend normally. Meanwhile, the second lateral surface 106b may extend normally like the first lateral surface 106a. Yet, according to one example of the present application, the second lateral surface 106b may tilt toward the inside or center O of the mobile terminal 100 or the case (e.g., the front case 101) from the orientation normal to the seating part 104. In particular, the second lateral surface 106b may include an inclining surface oriented at a prescribed angle toward the inside of center O of the mobile terminal 100 or the case (e.g., the front case 101). Owing to such an inclining orientation, the second lateral surface 106b prevents the adhesive A provided within the channel 105 from overflowing from the channel 105 and is also able to lead the adhesive A toward the bottom portion 105a of the channel 105. Hence, the second lateral surface 106b assists the second wall surface 105c to enable the channel 105 to be filled up with the adhesive A uniformly and also achieves the uniform and strong adhesion between the window 151a and the seating part 104. Referring to FIG. 9, the second lateral surface 106b may be continuously formed from the second wall surface 105c. In particular, the second lateral surface 106b may directly abut on or connect with the second wall surface 105c. In this case, the second lateral surface 106b and the second wall surface 105c can form a single large inclining surface substantially. Hence, the leading and uniform filling of the adhesive A can be achieved more effectively. When the second lateral surface 106b is continuously formed from the second wall surface 105c, it would be desirable for performing the function as mentioned above that the tilt angle of the second lateral surface 106b and the tilt angle of the second wall surface 105c are the same. However, these tilt angles may be different from each other, and this would not affect obtaining the intended function of continuous forming of the second lateral surface 106b and the second wall surface 105c. On the other hand, referring to FIG. 6 and FIG. 7, in case that the channel 105 has the third wall surface 105d, the second lateral surface 106b may be continuously formed from the third wall surface 105d. In this case, the second lateral surface 106b prevents the overflowing of the adhesive A by assisting the third wall surface 105d and is also able to continue to lead the adhesive A using its inclining surface.

Referring to FIG. 8, a structure around the spacer 106 is illustrated in detail. It is able to apply the adhesive A onto the seating part 104 using a nozzle. If the nozzle discharges the adhesive A by moving along the seating part 104 in the arrow direction shown in FIG. 8, the nozzle can maintain a fixed height from the seating part 104 during the discharge. If the spacer 106 has a considerable width W extending along the seating part 104, it can bring a considerable change of a shape of the seating part 104. Moreover, as mentioned in the foregoing description, since the nozzle maintains the fixed height, when the nozzle passes through a top end of the spacer 106, a distance between the nozzle and the spacer 106 may decrease considerably. Due to the decreasing distance, it may be highly possible that the adhesive A is not uniformly supplied to the spacer 106 and an area nearby the spacer 106. Hence, the relatively large width may expand a section to which the adhesive A is not uniformly applied. Due to this reason, it is preferable that the width of the spacer 106 is set as small as possible. And, it may be necessary to consider that such settings are reflected by the design. Referring to FIG. 8, the spacer 106 may have a cross-section in parallel with the surface 104c of the seating part 104 opposite the window 151a. And, this cross-section may have a width W and a length L relatively greater than the width W. Due to the tilting second lateral surface 106b, the cross-section changes in response to a height of the spacer 106. And, the cross-section becomes the largest on the boundary of the contact between the spacer 106 and the seating part 104. Since the cross-section on this boundary is constant with a largest value, it can become a reference for the design. Considering the seating part 104 and other neighbor structures, a width-to-length ratio (i.e., an aspect ratio (W/L)) of the cross-section can be expressed as 1/2.7 (i.e., 1:2.7) or smaller. Preferably, the aspect ratio of the cross-section may be set to 1/2.75 (i.e., 1:2.75). According to this aspect ratio, the spacer 106 has the width as small as possible. Hence, the spacer 106 does not interrupt the uniform application of the adhesive A, thereby achieving the uniform adhesion.

Figure 10:
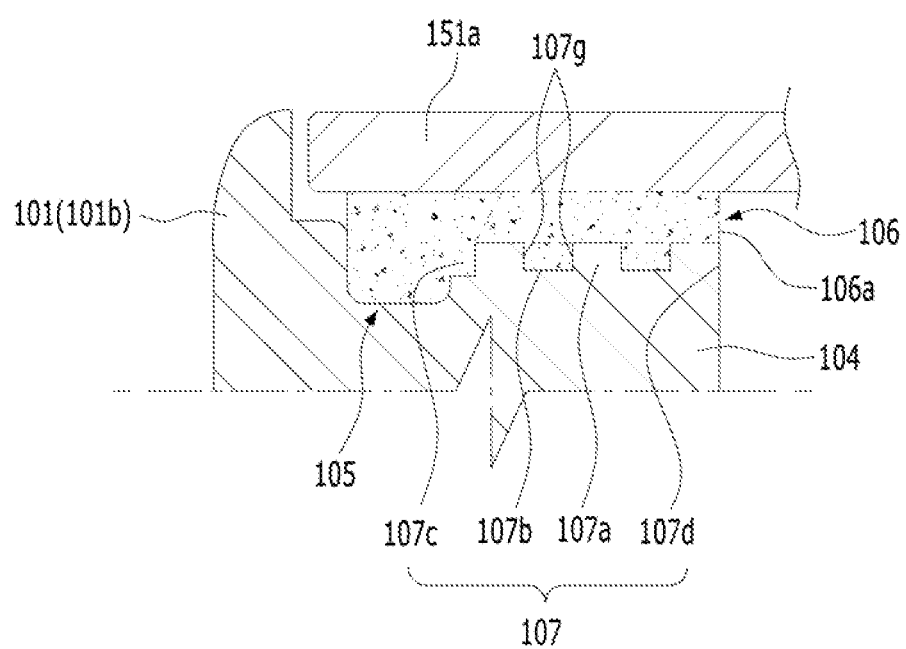
FIG. 10 is a cross-sectional diagram for one example of a pattern applied to a case in a mobile terminal according to the present invention.
Figure 11:
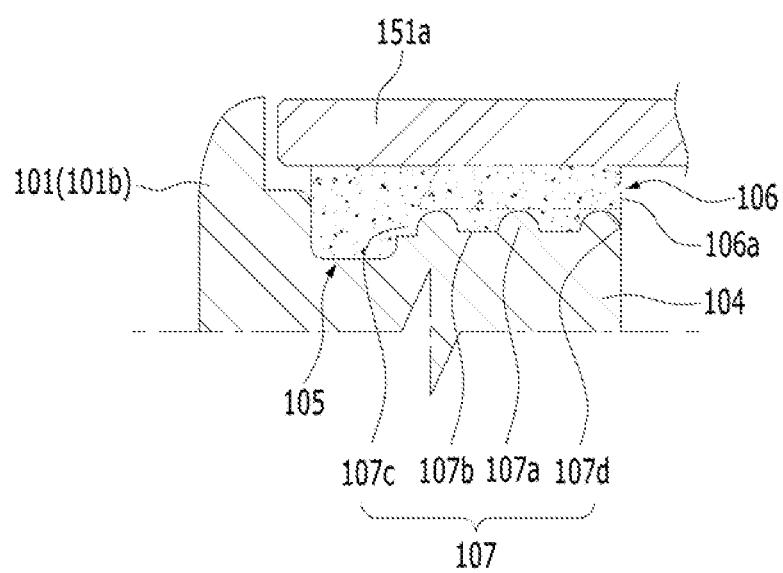
FIG. 11 is a cross-sectional diagram for another example of a pattern applied to a case in a mobile terminal according to the present invention.
Figure 12:
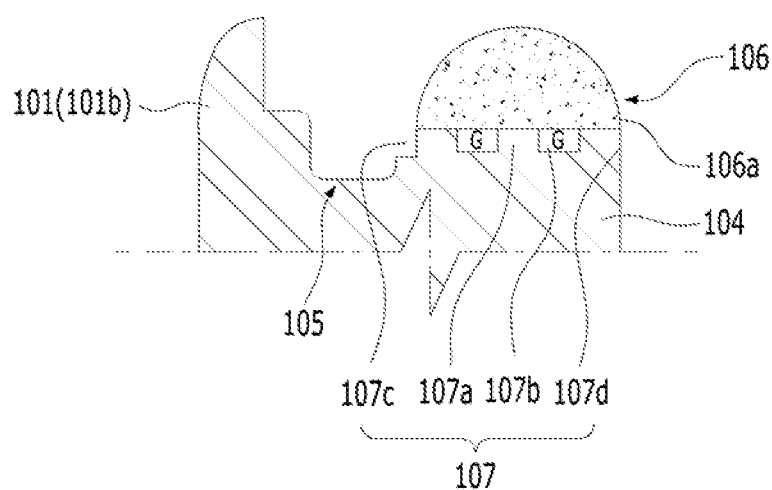
FIG. 12 is a cross-sectional diagram of a case having an adhesive applied thereto in a mobile terminal according to the present invention.
Figure 13:
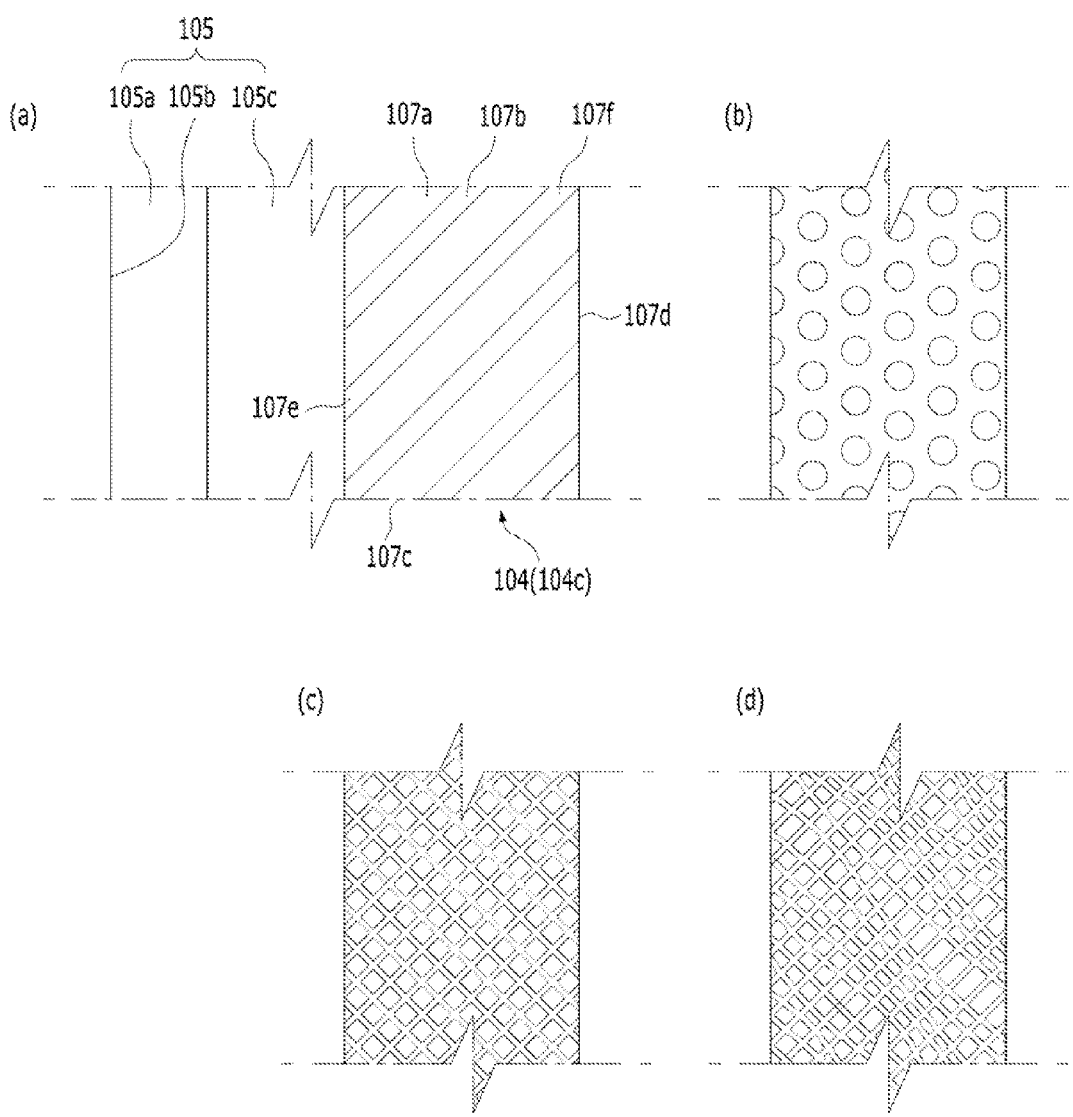
FIG. 13 is a layout for examples of a pattern applied to a case of a mobile terminal according to the present invention.
Figure 14:
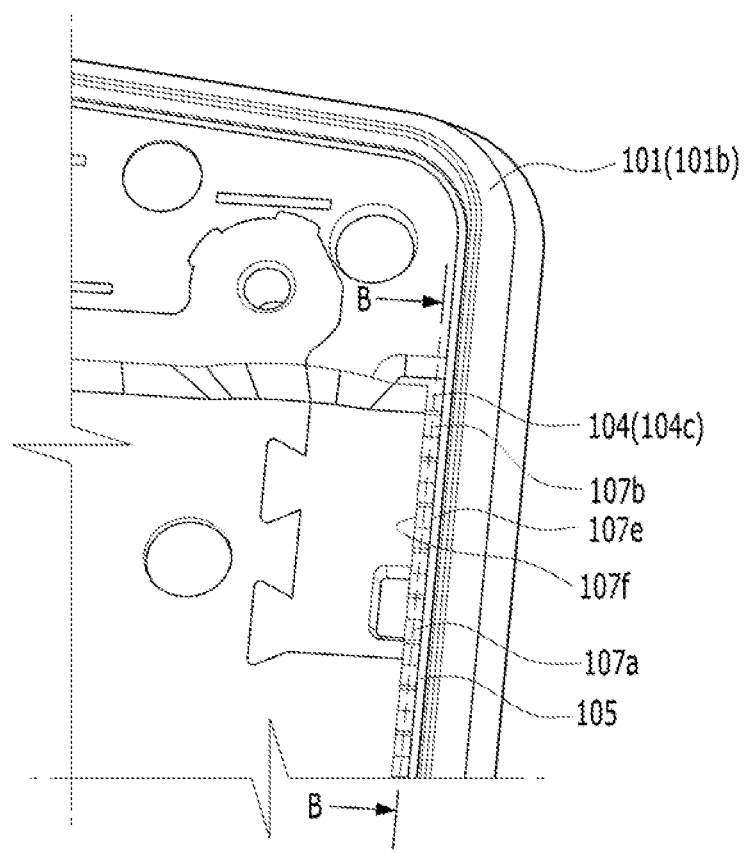
FIG. 14 is a perspective diagram for a modification of a pattern shown in FIG. 13(a)
Figure 15:
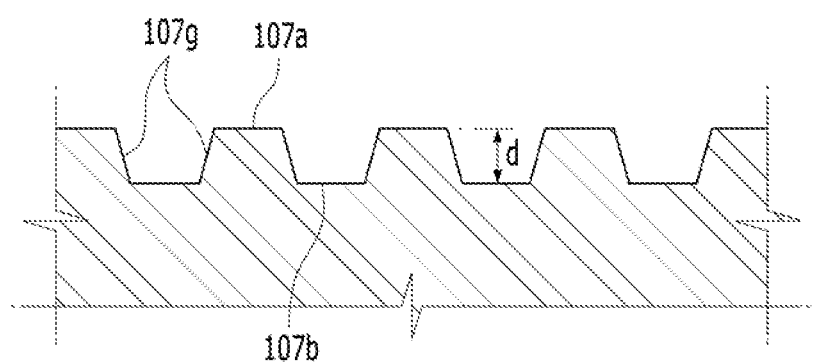
FIG. 15 is a cross-sectional diagram obtained along a cutting-plane line B-B shown in FIG. 14.

Referring now to FIG. 5, the case (e.g., the front case 101) can have a prescribed curvature along the display unit 151 having the curvature. Likewise, the seating part 104 and the channel 105 provided to the front case 101 may have the same curvature. Hence, referring to FIG. 5, the adhesive A provided to the seating part 104 and the channel 105 can flow to the center portion of the case (e.g., the front case 101) in the arrow direction. Particularly, since the seating part 104, i.e., the surface 104c between the channel 105 and the inner end of the seating part 104 is formed flat, the adhesive A may flow considerably. Such a flow may cause the non-uniform application of the adhesive A and fails to provide a uniform adhesive strength. Hence, in order to prevent the non-uniform application of the adhesive A, a prescribed pattern 107 may be provided to the seating part 104. FIG. 10 is a cross-sectional diagram for one example of a pattern applied to a case in a mobile terminal according to the present invention. FIG. 11 is a cross-sectional diagram for another example of a pattern applied to a case in a mobile terminal according to the present invention. FIG. 12 is a cross-sectional diagram of a case having an adhesive applied thereto in a mobile terminal according to the present invention, and FIG. 13 is a layout for examples of a pattern applied to a case of a mobile terminal according to the present invention. Moreover, FIG. 14 is a perspective diagram for a modification of a pattern shown in FIG. 13(a) and FIG. 15 is a cross-sectional diagram taken along a line B-B in FIG. 14. For the accurate description and easy understanding, reference numbers are given to the example (a) among various examples shown in FIG. 13 and a detailed structure of a neighboring channel 105 is illustrated in FIG. 13(a) together with the corresponding example of pattern. Further, for the same reason, the reference numbers are also given to the pattern of FIG. 14, which is the modification of straight line or stripe pattern as shown in FIG. 13(a). Although the reference numbers and channel structure are given to the example shown in FIG. 13(a) and FIG. 14 only, they are applicable to other examples (b) to (d) without special modification.

First of all, like the spacer 106, a pattern 107 may be provided onto the surface 104c of the seating part 104 opposite the display unit 151, i.e., the window 151a. Since it is highly possible that the adhesive A leaks out of the case, the adhesive A may be nearly applied nearby the outer circumferential portion of the case (e.g., the front case 101). Hence, the pattern 107 may be formed on the surface 104c of the seating part 104 formed between the channel 104 and the inner end or the inner circumference of the seating part 104 together with the spacer 106. In particular, the pattern 107 may be formed on one portion of the above-described surface of the seating part 104 except the portion having the spacer 106 disposed thereon.

In more particular, referring to FIG. 10 and FIG. 11, the pattern 107 may include a plurality of peaks 107a and a plurality of bottoms 107b. The peaks 107a and the bottoms 107 are formed alternately and may connect with each other. Cross-section of the peak and bottom 107a and 107b, as shown in the drawing, may have a rectangular or semispherical shape. Besides, the cross-section of the peak and bottom 107a and 107b may have one of various shapes. The pattern 107 may basically have a plane including stripes or straight lines shown in FIG. 13(a). Moreover, referring to FIG. 13(b), a plane including a multitude of projected dots may be applied as the pattern 107. Moreover, a mesh pattern shown in FIG. 13(c) or a grain pattern shown in FIG. 13(d) may be applicable. The grain pattern is similar to the stripe pattern but differs in the peak and bottom 107a and 107b configured to extend not straightly but serpently. Moreover, while the stripe or straight line pattern 107 of FIG. 13(a) may be oriented to tilt toward an outer circumferential portion of the case (e.g., the front case 101), the stripe or straight line pattern 107 of FIG. 14 may be oriented normal to the outer circumferential portion of the case (e.g., the front case 101). Alternatively, such a stripe or straight line pattern 107 may be parallel to the outer circumferential portion of the case (e.g., the front case 101) or the channel 105.

Once the adhesive A is applied to the seating part 104, the pattern 107, and more particularly, the bottom 107b can be filled up with the adhesive A. The adhesive A is blocked by the peak 107a so as not to flow to some extent. Hence, the adhesive A may stay in the bottom 107b. In particular, the pattern 107 may be configured to hold the adhesive A not to flow. Hence, although the seating part 104 has a prescribed curvature, as shown in FIG. 5, the pattern 107 can maintain a uniformly applied state of the adhesive A, thereby enabling a uniform and strong adhesion. Moreover, since the contact area between the adhesive A and the seating part 104 is considerably increased by the formation of the pattern 107, an adhesive strength can be substantially increased. Moreover, as the adhesive A is held in the bottom 107b, an additional adhesive or bonding thickness formed by such a held adhesive A can be obtained. Thus, the adhesive or bonding strength can be significantly increased by the additional adhesive or bonding thickness of the adhesive A. More specifically, the pattern 107 of FIG. 13(a) may have the peak and bottom 107a and 107b which are longer than those of FIG. 14, due to its tilting orientation. Because the lengthy peak and bottom 107a and 107b are advantageous for restricting or blocking the flow of the adhesive A on the seating part 104, it may be preferable for the pattern 107 of FIG. 13(a) to be applied to the case or the seating part 104 having the curvature. In contrast, the tilting pattern 107 of FIG. 13(a) may be difficult to be formed compared with the non-tilting pattern 107 of FIG. 14, and thus can cause the increase of manufacturing cost. Further, the flow of adhesive A may not occur significantly at the flat mobile terminal, i.e. the flat case and flat seating part 104. For these reasons, it may be first considered to apply the pattern 107 of FIG. 14 to such a flat case or the flat seating part 104. Nevertheless, due to the significant increase of adhesive strength by the increased adhesive surface and thickness, the pattern 107 of FIG. 14 may be effectively applied to the curved case and the curved seating part 104 thereof.

As shown in FIG. 10 and FIG. 15, the pattern 107 may include a side wall 107g formed between the peak 107a and the bottom 107b. The side wall 107g may connects the peak 107a and the bottom 107b. Referring to FIG. 10, the side wall 107g may be formed substantially normal to the bottom 107b or the peak 107a. Alternatively, the side wall 107g may tilt with regard to the bottom 107b or the peak 107a as shown in FIG. 15, and may have the adhesive surface increased, compared with the normal side wall 107g in FIG. 10. That is, with the tilting side wall 107g, the pattern 107 may have a saw-toothed cross section. Therefore, the tilting side wall 107g can increase the adhesive or bonding strength. The tilting side wall 107g and the saw-toothed cross section of FIGS. 14 and 15 can be applied to the various patterns shown in FIG. 10-FIG. 13. Further, as shown in FIG. 15, the depth d of the bottom 107b may be 0.05 mm and the same depth may be applied to all the patterns 107 as illustrated. Such a depth d can achieve the intended functions as described above without decreasing the structural strength of the case. Recently, a flexible display made of deformable material such as plastic has been developed. The flexible display can be easily deformed to have a predetermined curvature, and thus can be directly applied to the curved mobile terminal. However, the flexible display may tends to be restored to its original shape, the sufficient adhesive strength is required to attach the flexible display to the curved display. As the pattern 107 provides the significantly increased adhesive strength, the flexible display can be rigidly attached to the case, i.e. the seating part 104 by applying the pattern 107 to the seating part 104.

Meanwhile, since the nozzle drops the adhesive A down toward the seating part 104, as shown in FIG. 10, when the adhesive A is applied to the seating part 104, air G may be trapped in the bottom 107b of the pattern 107. If the trapped air G remains instead of being appropriately discharged, it may cause a non-uniform adhesion to lower the adhesive strength. Hence, the pattern 107 may be configured to discharge the air trapped in the bottom 107b. To this end, the pattern 107 can be configured to communicate with an outside of the pattern 107 in order to discharge the air G. As mentioned in the foregoing description, the adhesive A is applied to the seating part 104, and more particularly, to a top portion of the pattern 107 and a bottom portion of the pattern 107 is basically closed down. Hence, lateral portions 107c and 107d of the pattern 107 in parallel with the outer circumferential portion of the case (e.g., the front case 101) or the channel 105 can communicate with their outsides, i.e., the channel 107 and the inside of the case. In particular, referring to FIGS. 13(a) and 14, the bottom 107b of the pattern 107 may have first and second ends 107e and 107f opposite to each other. Moreover, the first end 107e may communicate with the channel 105, while the second end 107f communicates with the inside of the case through an inner end of the seating part 104. If the window 151a pressurizes the seating part 104 in the course of an adhesion process, the air G is pushed out of the bottom 107b so as to be discharged into the channel 105 and the inside of the case through the first end 107e and the second end 107f, respectively. Hence, the air G can be effectively removed from the pattern 107 by the communicating structure of the pattern 107, whereby the uniform application and adhesion can be achieved.

The above-mentioned pattern 107 is described with reference to the curved terminal 100 shown in FIG. 5. Moreover, the pattern 107 can apply to the flat terminal 100 shown in FIGS. 1 to 3 as well for the same purposes and achieve the same functions and effects. That is, the pattern 107 can be applied to the flat case and/or the flat seating part 104 thereof for the same purposes, functions, and effects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a case;
a display unit located at the case;
a seating part located at the case, the seating part configured to support the display unit;
a channel located at the seating part, the channel configured to receive an adhesive to couple the display unit to the case, the channel including:
a bottom portion;
a first wall surface extending from the bottom portion toward the display unit; and
a second wall surface extending from the bottom portion toward the display unit, the second wall surface being disposed between a center of the case and the first wall surface, and the second wall surface tilting at a first angle toward the center of the case; and
a spacer located at the seating part, the spacer being configured to maintain an interval between the display unit and the seating part, the spacer including:
a first lateral surface; and
a second lateral surface spaced apart from the first lateral surface, the second lateral surface being disposed between an outside of the case and the first lateral surface, the second lateral surface tilting at a second angle toward the center of the case.

2. The mobile terminal of claim 1, wherein the display unit is curved.

3. The mobile terminal of claim 1, wherein the display unit has a curvature formed along a length direction of the mobile terminal.

4. The mobile terminal of claim 1, wherein the case includes an opening having the display unit located therein, and
wherein the seating part extends toward the center of the case from an inner circumferential surface of the case defining the opening.

5. The mobile terminal of claim 1, wherein the display unit includes:
a display module; and
a window covering the display module, the window being attached to the seating part.

6. The mobile terminal of claim 5, wherein the display module is directly attached to the window.

7. The mobile terminal of claim 1, wherein the channel is spaced inward from an outer circumferential portion of the case enclosing the display unit.

8. The mobile terminal of claim 1, wherein the first wall surface is spaced inward from an outer circumferential portion of the case enclosing the display unit.

9. The mobile terminal of claim 1, wherein the first wall surface extends substantially normal to the bottom portion of the channel.

10. The mobile terminal of claim 1, wherein the first angle is 30 degrees with respect to the bottom portion of the channel.

11. The mobile terminal of claim 1, wherein the channel further includes a third wall surface extending from the second wall surface towards the display unit, the third wall extending substantially normal to the bottom portion of the channel.

12. The mobile terminal of claim 1, wherein the second lateral surface is formed as a continuation of the second wall surface such that the first angle and the second angle are the same.

13. The mobile terminal of claim 1, wherein the spacer has a cross-section at a boundary abutting the seating part, and
wherein an aspect ratio of the cross-section is 1:2.7 or smaller.

14. The mobile terminal of claim 1, further comprising a pattern provided in the seating part, the pattern being configured to hold an adhesive supplied to the seating part so as not to flow on the seating part.

15. The mobile terminal of claim 14, wherein the pattern is provided to a top surface of the seating part formed between an inner circumference of the seating part and the channel, and
wherein the pattern comprises a peak and a bottom, which are alternately formed.

16. The mobile terminal of claim 15, wherein a depth of the bottom is 0.05 mm.

17. The mobile terminal of claim 14, wherein, when the adhesive is applied to the pattern, the pattern is configured to communicate with an outside of the pattern, and
wherein opposite ends of the pattern communicate with the channel and an inside of the case, respectively.

18. The mobile terminal of claim 14, wherein the pattern is oriented to tilt toward an outer circumferential portion of the case, or
wherein the pattern is oriented normal to the outer circumferential portion of the case.

19. A mobile terminal comprising:
a case;
a display unit located at the case;
a seating part located at the case, the seating part configured to support the display unit;
a channel located at the seating part, the channel configured to receive an adhesive to couple the display unit to the case, the channel including:
a bottom portion;
a first wall surface extending from the bottom portion toward the display unit; and
a second wall surface extending from the bottom portion toward the display unit, the second wall surface being disposed between a center of the case and the first wall surface, and the second wall surface tilting at a first angle toward the center of the case; and
a pattern provided in the seating part, the pattern being configured to hold an adhesive supplied to the seating part so as not to flow on the seating part.

* * * * *